Nov. 11, 1958

H. O. STOELTING ET AL 2,860,210

CIRCUIT INTERRUPTING DEVICE

Filed Nov. 9, 1956

INVENTORS.
Herman O. Stoelting
Francis V. Cunningham
BY
Arnold J. Ericsen
Attorney Nov. 11, 1958
H. O. STOELTING ET AL
2,860,210
CIRCUIT INTERRUPTING DEVICE
Filed Nov. 9, 1956
2 Sheets-Sheet 2
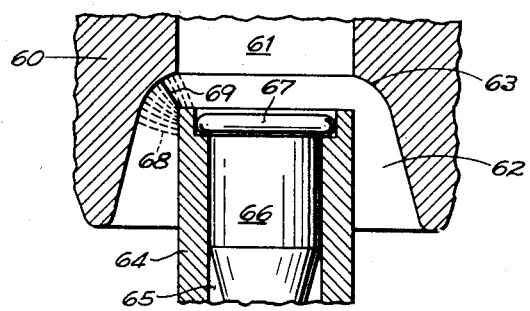
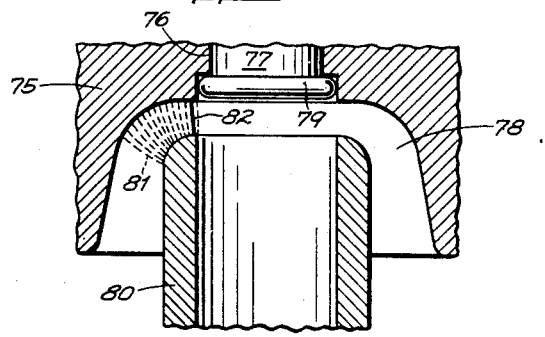
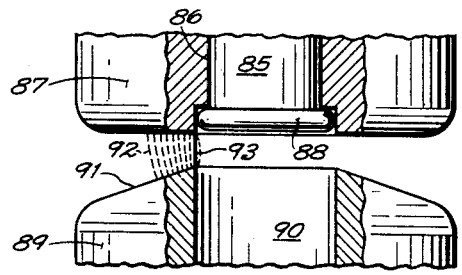
INVENTORS.
Herman O. Stoelting
Francis V. Cunningham
BY
Attorney

United States Patent Office 2,860,210
Patented Nov. 11, 1958

2,860,210

CIRCUIT INTERRUPTING DEVICE

Herman O. Stoelting and Francis V. Cunningham, Milwaukee, Wis., assignors to McGraw-Edison Company, a corporation of Delaware Application November 9, 1956, Serial No. 621,292

3 Claims. (Cl. 200—115)

The present invention relates to circuit interrupting devices having particular application as means for disconnecting an electrical connection, such as the ground lead of a lightning arrester if such arrester should become damaged due to a direct stroke of lightning or for some other reason affecting the ability of the arrester to interrupt power follow current.

Manufacturers have long striven to develop lightning arresters with low IR discharge voltages. This is one of the most important factors contributing to a greater margin of protection in the region of equipment insulation strength. The reason for this is that to provide sufficient insulation strength in equipment, such as transformers, this insulation strength can be increased only at very high expense and would require proportionally larger operating elements and tanks to accommodate the added insulation. It is also to be noted that insulation levels tend to decrease as the device is used, and as it ages in service.

Obviously, it is to the advantage of the user of the equipment to provide surge protection by means of relatively inexpensive lightning arresters which are designed to perform a protective function evaluated largely on the basis of its IR discharge voltage. This voltage is the product of the lightning current multiplied by the valve block resistance in the case of a valve type lightning arrester.

The cushion or margin of protection of the protected equipment is signified by the area measured on a volt-time curve, between the minimum impulse strength curve of the protected device and the IR discharge voltage curve of the arrester. Thus the greater the margin, the greater the factor of safety provided by the arrester.

An unknown amount of insulation strength usually exists between the actual and the demonstrated minimum impulse insulation strength of a particular device. Variations likewise occur in the IR discharge voltage of valve type lightning arresters. These variations exist from arrester to arrester since they are a mass-produced product. Thus, it is to everyone's advantage to provide an IR discharge voltage, by proper choice of components, which offers as great as possible a protective margin between the impulse strength of the protective device and the arrester.

Ameliorating circumstances in the development of spark gaps and choice of valve material have led to continued improvement in reduction of the arrester IR drop or discharge voltage.

Another problem concerning designers of lightning arresters is the fact that, occasionally an arrester may be damaged by lightning or from other causes. The number of such cases appears to be small, and damage to the arresters is in itself no cause for concern. However, a damaged arrester is usually a short circuit, and it is desirable that an arrester in such condition remove itself from the system as quickly as possible. Otherwise, the short-circuited arrested will lock out the circuit it is designed to protect until it has been found and removed. This may be a time-consuming and costly matter, besides being very annoying to utility linemen. In the past, valve arresters have been designed to clear themselves from the circuit, if damaged, by providing a frangible housing which ruptures on heat produced by sustained follow current passing through the damaged arrester, or by some other means for disconnecting one of the leads.

A very satisfactory means for disconnecting at least one of the leads to a damaged lightning arrester has been provided by the attachment of a circuit interrupter including an explosive cartridge which sets off a small charge of explosive material for interrupting a lead, such as the ground connection. The interrupters are designed so that they will not operate each time the arrester discharges and clears the follow current in a normal fashion. They only operate in the infrequent emergency of a damaged arrester. A very successful device of this nature has been used commercially for a number of years and takes the general form as that disclosed in the patent granted to Ralph H. Earle for an Automatic Circuit-Interrupting Device, issued on March 30, 1943, and bearing Patent No. 2,315,320. This patent is assigned to the same assignee as is the present invention.

Although devices such as those disclosed in the Earle patent have consistently provided adequate protection in the case of damage to an arrester, it has been found that the recent efforts to provide lightning arresters with lower IR discharge voltage, have led to arresters which permit the flow of much higher follow current during normal operation thereof. It was made apparent that the increased follow-current of an arrester in good operating condition could, on occasion, provide sufficient means for actuating the explosive cartridge of the interrupter to set off the charge and disconnect the lead attached to the interrupter member.

It is therefore, a primary object of the present invention to provide an improved circuit interrupting device for a lightning arrester or the like, which is capable of passing normally relatively higher current therethrough without operation of the means for separating terminals of the interrupter, until the arrester or device with which the interrupter is associated, has become damaged or otherwise ceases to function in the manner for which it was intended.

Another object of the present invention is to provide a means for shielding an explosive cartridge for the circuit interrupter, wherein the cartridge is shielded from direct contact of power follow current arc terminals, wherein said explosive cartridge is prevented from prematurely discharging during normal current flow affecting an undamaged arrester operating in conjunction therewith.

A further object of the present invention is to provide an improved circuit interrupter arranged for cooperation with a lightning arrester to prevent line lockout if such arrester should become damaged and fail to interrupt power follow current, wherein said interrupter, in each of several embodiments, is provided with an explosive cartridge for effecting circuit interruption under predetermined current flow, said explosive cartridge being mounted in an axial recess provided in an electrode of said interrupter and being disposed therein.

Embodiments of the invention are shown in the accompanying drawings, in which:

Figs. 4 through 6 are fragmentary views of cooperating electrodes, illustrating several embodiments of interrupters functioning similar to the embodiment disclosed in Figs. 1–3, inclusive.

Figure 1:
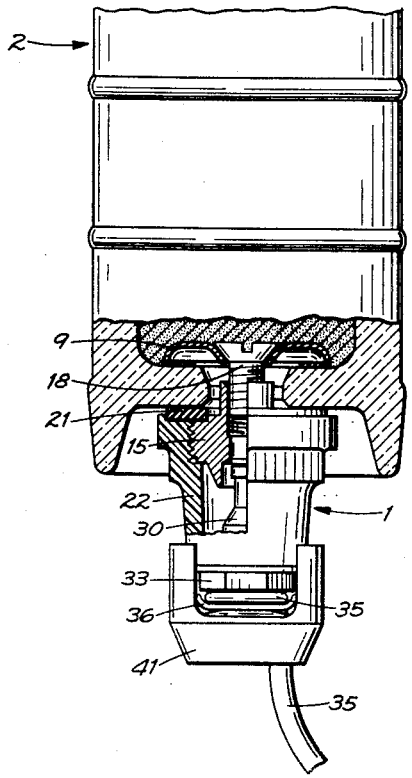
Fig. 1 is an elevation of a lightning arrester with the circuit interrupter attached thereto, and with parts broken away and parts in section.

Referring to the drawings, it will be seen that the circuit interrupter, denoted generally by the reference numeral 1, may be attached directly to a lightning arrester, denoted generally by the reference numeral 2. The arrester may be of a conventional type, or as specifically shown in Fig. 1, according to the structure previously disclosed in the copending application of Francis V. Cunningham for Spark Gap Assembly, Serial No. 571,543, filed March 14, 1956, and assigned to the same assignee as is the present invention. The arrester 2 comprises a ceramic, glass, or other insulating housing 3, within the upper part of which is housed a series gap assembly comprising spaced insulating support members 4, providing a means for supporting gap electrode members 5 in spaced apart relationship to form a series of spark gaps 6.

The upper portion of the lightning arrester 2 is connected to a line lead or power line by means of the conductor 7, and is enclosed by means of the insulating cap 8. The lower part of the arrester is provided with a lower terminal 9, and a non-linear resistance material 10, such as silicon carbide crystals, is interposed between the lower end of the spark gap structure and the lower terminal 9. The non-linear resistance material may be in the form of a series of stacked blocks of comminuted silicon carbide molded in solid form with a suitable bonding agent, such as sodium silicate.

Figure 2:
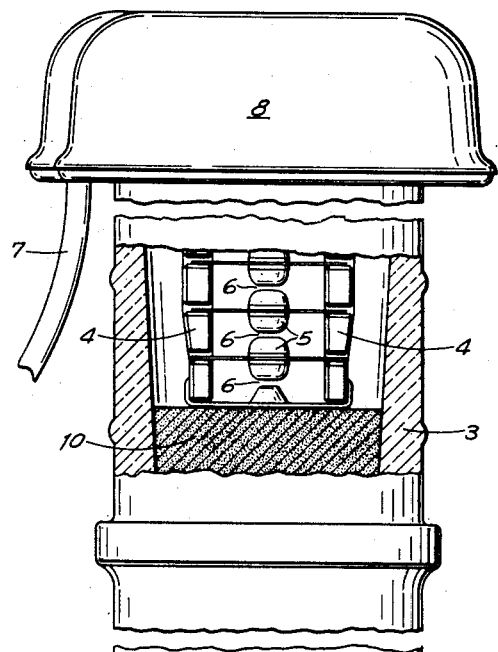
Fig. 2 is an enlarged sectional view of the interrupter shown in Fig. 1.

The interrupting device 1 has the similar operating characteristics and a similar general structure as that disclosed in the previously mentioned Earle patent, and is shown in enlarged detail in Fig. 2. The preferred construction for the interrupter includes an upper electrode or terminal member 15, which is preferably provided with a co-extensive bore 16 having an internally threaded portion 17 engageable with a machine screw terminal member 18 projecting from the lower terminal 9 of the arrester 2, as disclosed in Fig. 1. The bore 16 of the terminal 15 is preferably counterbored at the lower end to provide a spark gap chamber 19 including an intermediate tapered portion 20 communicating with the bore 16 and the chamber 19.

A resilient gasket 21 is provided as a weather seal and a cushioning means between the members 1 and 2.

The upper electrode 15 is preferably threaded into engagement with an insulating housing 22, which may be of a material such as a phenolic resin, or of any insulating material having the desired insulating and strength properties, in addition to being frangible at its weakest section for purposes hereinafter described. It is preferable to provide circumferentially spaced lock holes 23, or some other means, for engagement with corresponding lock lugs in a washer 32. Projecting within the bore 24 is a lower terminal member or electrode 30 with a gasket 31 interposed therebetween. It is also preferred to provide the washer 32 between the lower surface of the housing 22 and the threaded nut 33 engageable with an externally threaded portion 34 of the electrode 30. This arrangement permits secure fastening of the electrode 30 to the housing 22.

Electrical connection with a ground lead 35 is preferably made by means of a conducting spring washer 36 urging the conductor lead into electrical contact with the nut 33 and from there to the threaded portion 34 of the lower electrode 30. Secure connection is made between the members by means of a bolt 37 threadingly engaging the internal bore 38 of the electrode 30. The head of the threaded bolt 37 preferably engages the metal fitting member 39 by means of a lock washer 40. The member 39 is inserted during molding of an insulating shell 41 provided to house the various connections.

Figure 3:
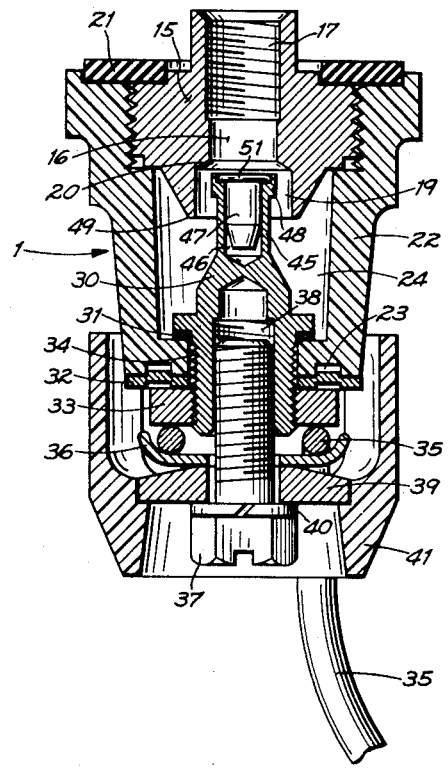
Fig. 3 is a fragmentary view of the cooperating electrode portions, shown greatly enlarged, of the interrupter of Figs. 1 and 2.
Figure 3:
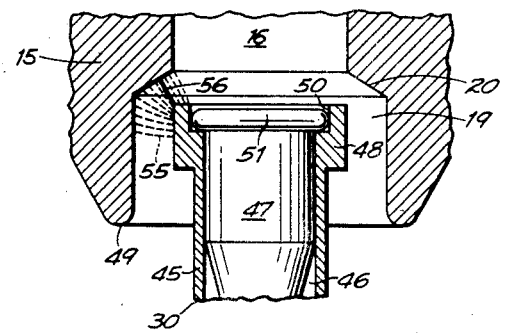

The electrode 30 is preferably provided, as shown in Fig. 2, and is illustrated in detail in the enlarged view of Fig. 3, with a stem portion 45 having a bore 46 for receiving the shank of an explosive cartridge 47. It is to be noted that the stem 45 is undercut and defines a shoulder 48. Thus, the 60 cycle arc will be encouraged to strike at the narrowest dimension between the shoulder 48 and the tapered surface 20 of the electrode 15. Gas pressure occurring concurrently with surge current arcs tends to force the arc into the distended cross-section defined by the stem portion located below the shoulder 45 and the bore surface of the electrode 15, where the arc may be extended, cooled and extinguished.

In the preferred embodiment of Figs. 1 through 3, the undercut also decreases the amount of metal between the arc and the explosive cartridge, in case arcing does occur at the unfavorable position.

It will also be noted that the bore 46 of the electrode 30 has been countersunk to provide the relatively larger bore 50 for receiving the head 51 of the explosive cartridge 47.

It is also to be noted that the control air gap defined by the terminals 15 and 30 is preferably of a particular configuration in that the electrodes are preferably placed in telescoped relation to provide a gap of constricted dimension between the upper surface of the shoulder 48 of the electrode 30 and the surface defining the tapered bore 20 of the electrode 15. The gap dimension is relatively distended in a direction away from the tapered portion 20 and towards the lip 49 at the lower end of the terminal 15, as viewed in Fig. 3. In fact, as stated before, the stem 45 is preferably undercut to provide an even greater gap distance between the lip 49 and the electrode 30 for purposes hereinafter described.

As illustrated in Fig. 3, the current path in the preferred embodiment is illustrated by the dotted lines 55 representing the surge current path and by the narrow solid line 56 representing the path of the follow current arc. These paths are merely representative of arcing occurring in one particular portion, whereas, the opposed surfaces of the cooperating electrodes 15 and 30 are preferably symmetrical about a common axis in order to provide a predetermined arc gap dimension about the same central axis.

Previous interrupters using explosive cartridges have included cartridges having at least the head portion exposed to the direct stroke of the arc, and especially the power follow current arc which effected the discharge of the explosive cartridge. Under circumstances of relatively high IR discharge voltages occurring in previous arrester designs, a direct arc stroke to the cartridge would not prematurely detonate the cartridge, as the power follow current arcs were not of sufficient amperage to provide the necessary energy to discharge the explosive element of the cartridge. That is, the power follow current passing through an undamaged arrester subsequent to the initiation of surge current by lightning or other surges was not of sufficient magnitude to effect discharge of the cartridge for disconnecting the ground or other connection. Thus, normal operation of an undamaged arrester did not affect the circuit interrupter. The interrupter only acted to sever the ground or other connection when the arrester was damaged and permitted sufficient follow current to arc to the lower electrode or the cartridge head.

However, as stated previously, as arresters have been improved to provide relative lower IR discharge voltage, the magnitude of power follow current affecting the interrupter has been proportionally increased. On occasion, the explosive cartridge of interrupters of previous design provided for the improved arresters would discharge prematurely to sever the ground connection even though the arrester was undamaged.

The present invention overcomes the problem of premature discharge by providing the electrode 30 with a retaining means, such as the bore 46, arranged to receive the explosive cartridge 47 with none of the cartridge portions being exposed to the direct arc path of the power follower current arc 56, which obviously takes the shortest path between the spaced electrode members. This may be effectively accomplished by countersinking the bore of the electrode 30 to provide the bore 50 for receiving the head portion 51, thus shielding the cartridge from any direct stroke arcs. Obviously, other shielding means may be provided between the cartridge and the upper electrode 15 to permit a relatively greater mass of metal between the arc terminals and the gun powder (not shown). Thus, the electrode 30 bearing the cartridge 47 is provided with a design that will shield the cartridge from the direct stroke of a power follow current arc 56.

Surge current, as illustrated by the dotted lines 55, because of its much greater magnitude, covers a much larger area on the electrodes, and thus does not directly effect discharge of the explosive cartridge 47, especially as shielded. It will be apparent that in all of the embodiments, the air gap is provided with a constricted portion between the electrodes which gradually distends along the telescoped axis. The narrowest gap spacing occurs at the point preferred for the 60-cycle arcing. It is probable that surge voltages would spark over the gap and start the surge arc at the closest spacing between the electrodes. From this point on the electrode, the designs of the various embodiments provide sufficient area for the surge arc to spread, and thus not concentrate at a particular point where it might prematurely act to discharge the explosive cartridge. The remaining embodiments of Figs. 4, 5 and 6 relate to the present invention and show various structures in which it may be incorporated.

The embodiment of Fig. 4 utilizes a modified electrode or terminal structure, wherein the terminal or electrode 60 includes a symmetrical counterbore communicating with the coextensive bore 61. The counterbore 62 is cup-like, and provides a graduated arcing surface which includes an arcing surface of a relatively smaller radii 63 in the proximity of the cooperating electrode or terminal 64. Here again, the electrode 64 is provided with a chamber or bore 65 for receiving an explosive cartridge 66. As in the case of the first embodiment, the electrode 64 is counterbored at its extremity to receive the cartridge head 67.

It will be apparent that the surge current, which is shown by the dotted lines 68, will spark over at the smallest dimension between the electrode 64 and 60. However, the configuration of the bore 62 of the electrode 60, will encourage the surge current to quickly spread along the distended path to be cooled and dissipated. Thus, 60 cycle arc 69 will be encouraged to strike at the shortest dimensional path between electrodes, rather than in the conductive ionized atmosphere established by surge current arcs. Because of the smooth, contour and rapid distention of the arcs between the electrodes, reduction of the diameter of the lower electrode 64 is not deemed to be necessary, as the power follow current arc will readily strike and restrike (under certain operating conditions) across at the line 69. Again, the cartridge head 67, as well as all portions of the cartridge 66, is entirely recessed in the bore of the electrode 64 with no portion protruding into the gap between electrodes.

The embodiment of Fig. 5 includes an electrode or terminal 75 having a bore 76 for receiving an explosive cartridge 77. The electrode or terminal 75 is counterbored to provide an arc surface of cup-like contour similar to that of the embodiment of Fig. 4. In the present case, the terminal 75 is counterbored for receiving the head 79 of the cartridge 77, or is otherwise machined to fully recess the cartridge in order that no portion of the cartridge is exposed to the direct arc path.

In the present embodiment, the lower electrode 80 is preferably tubular, at least for a predetermined distance measured from the free end, as shown, to prevent discharge directly from the electrode to the cartridge. It is to be noted that the surge current, designated by the dotted lines 81, will initiate at the shortest point between the electrodes and, because of the gradually distended gap provided therebetween, the path of the surge current arc and relatively low magnitude follow current arcs 82 are cooled and extinguished before discharging the cartridge 77.

Here again, it will be noted that the arcing occurs between the electrodes, and does not directly terminate on the explosive cartridge, which is shielded therefrom.

The embodiment of Fig. 6 includes the reception of the explosive cartridge 85 within a bore 86 of the upper electrode or terminal 87. The bore 86 is countersunk to provide a means for receiving the head 88 of the cartridge 85, in order to totally shield the cartridge from arc termini created between the electrodes. The lower electrode 89 is provided with a bore 90 to prevent arcs from striking between this electrode and the cartridge head 88.

It will be noted that the electrode 89 is provided with a tapered arcing surface 91 which defines a gradually distended arc gap between the electrodes. It will be apparent that either or both of the electrodes may be tapered in this fashion.

The surge current is designated by the dotted lines 92, and is initiated at the shortest distance between the electrodes, which is also designated by the solid line 93. It will be noted that the arcs of both surge current and power follow current are shielded from direct contact with the explosive cartridge 85 to prevent premature discharge of the cartridge for separating the terminals.

As previously mentioned, in all embodiments it is preferred to provide the insulating housing, such as the housing 22 of the embodiment of Figs. 1–3, with a frangible means either by an inherent mechanically weak characteristic or by a frangible section of relatively less thickness, such as the lowest point of the wall defining the bore 24, as viewed in Fig. 2. Thus, the explosive discharge will be encouraged to provide a clean break between elements for extension of the spark gap and the disconnected lead 35 will act as a visible indicator for the damaged arrester.

It will be apparent that, although it is preferred to provide previously sealed cartridges filled with explosive powder, it is within the province of the present invention to dispose the explosive element directly in the bore, such as bore 46, of either electrode. Although not shown in the drawings, the electrode would be hermetically sealed with an appropriate closure after being filled with a predetermined amount of powder, as per conventional practice used in sealing cartridges and the like.

The present invention would also apply to this arrangement in that it would be preferred to countersink the electrode bore to receive the closure in order to shield it from direct contact with the arc termini. Other means may also be provided for shielding, as previously suggested, which might include a shielding ring circumjacent to the end portion of the electrode (not shown). The main factor would be in protecting the powder and its physically contacting closure from the direct arc path as defined by the intermediate air gap between the opposed electrodes.

Although the preferred embodiment has been described with the explosive cartridge being disposed in its entirety within the bore of its particular electrode member, it will be understood that it is within the province of the present invention to provide a conducting member having a thru-bore wherein a portion of the cartridge may extend beyond the confines of the member of the side opposite the controlling gap (not shown). The main feature is to provide a shielding means from direct contact with the follow current arc termini, by means of recessing, such as counterboring or the like.

In addition, it is within the province of the present invention to provide the explosive element recessed from the proximity of the control gap when it may be subject to the effects of arc termini, even though such gap may not be extended on explosion of the cartridge. That is, the explosive element may have its recessed headed portion in the proximity of a control gap and another portion extending into a frangible chamber of the housing (not shown) to expel the entire electrode structure.

We claim:

1. In a circuit interrupter including an insulating housing, spaced upper and lower electrodes providing an air gap therebetween, the lower of said electrodes including a bore and an enlarged terminal heat dissipation and arc striking area surrounding said bore, and a headed explosive cartridge for separating said terminals to extend said air gap on excessive flow of current through said interrupter; said cartridge being disposed in said bore, said bore being countersunk at one end and being of sufficient depth to receive the headed portion of said cartridge, whereby the said headed portion will be maintained flush with or below the lower electrode surfaces defining said air gap.

2. A circuit interrupter according to claim 1 wherein the upper electrode is characterized by a cup-like configuration, a portion of which telescopically fits over and is spaced from said lower electrode, said upper electrode also having a through bore.

3. The combination with a substantially sealed lightning arrester having a terminal portion, of a substantially sealed circuit interrupter including an insulating housing, an upper electrode in said housing having a through bore and being in electrical and physical connection with said terminal portion, a lower electrode member spaced from said first electrode and providing an air gap therebetween, said lower electrode having an enlarged terminal arc striking and heat dissipation area and a recessed countersunk bore, and an explosive cartridge for separating said electrodes to extend said air gap on excessive flow of current through said interrupter; said cartridge being disposed throughout its entire actual length in said countersunk bore, wherein substantially no portion of said cartridge protrudes into said air gap, said circuit interrupter including sealing means for sealing attachment to said lightning arrester to prevent moisture from entering the interior thereof through said through bore in said upper electrode.

References Cited in the file of this patent

UNITED STATES PATENTS

| | | |
|---|---|---|
| 2,315,320 | Earle | Mar. 30, 1943 |
| 2,551,858 | Stoelting et al. | May 8, 1951 |
| 2,607,869 | Stoelting et al. | Aug. 19, 1952 |